May 15, 1962  J. E. STARR  3,035,240
BEAM-DIAPHRAGM PRESSURE LOAD CELL IMPROVEMENTS
Filed Dec. 1, 1960  2 Sheets-Sheet 1
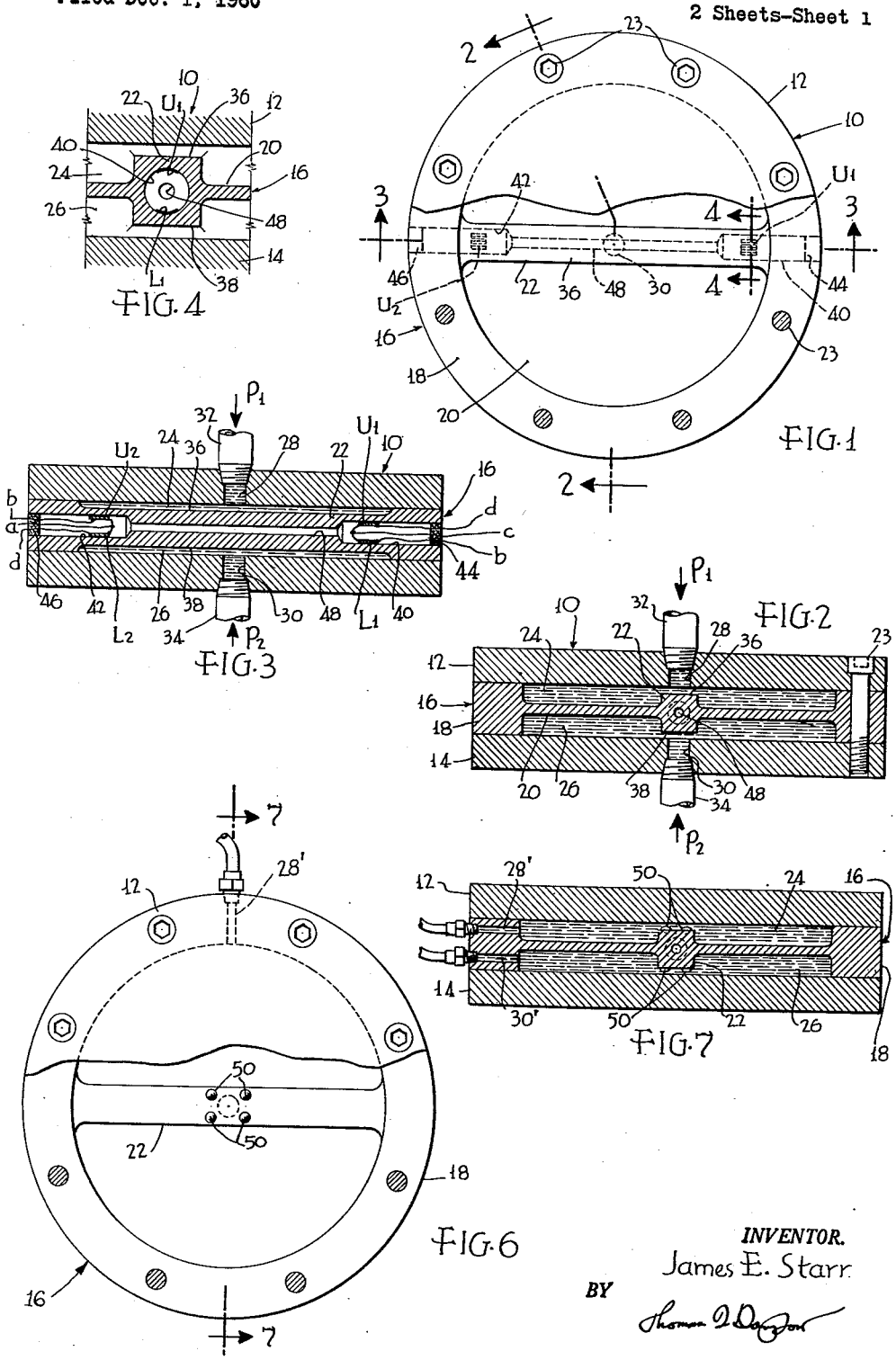
INVENTOR.
James E. Starr
BY
Thomas D. Dogson
ATTORNEY May 15, 1962 J. E. STARR 3,035,240
BEAM-DIAPHRAGM PRESSURE LOAD CELL IMPROVEMENTS
Filed Dec. 1, 1960 2 Sheets-Sheet 2

INVENTOR.
James E. Starr
BY
ATTORNEY

United States Patent Office 3,035,240
Patented May 15, 1962

3,035,240
BEAM-DIAPHRAGM PRESSURE LOAD
CELL IMPROVEMENTS
James E. Starr, Cumberland, Md., assignor to The Budd
Company, Philadelphia, Pa., a corporation of Pennsylvania
Filed Dec. 1, 1960, Ser. No. 73,057
6 Claims. (Cl. 338—4)

This invention pertains to improved beam-diaphragm load cells for the measurement of fluid pressure and more particularly to such load cells as adapted for the measurement of small variations of high-pressure loads.

A beam-diaphragm pressure load cell comprises a lateral diaphragm, an elongated longitudinal beam formed integrally parallel with the diaphragm, and a rigid supporting means fixing the ends of the beam and the periphery of the diaphragm. A bending load is transmitted to the beam by the diaphragm in response to different fluid pressures applied at opposite surfaces of the diaphragm. The resulting beam strains may be measured and interpreted as equivalent to the magnitude of the pressure differential.

The basic beam-diaphragm pressure cell, a most significant advance in the load cell art, is disclosed and claimed in the copending application of William T. Bean, Jr., Serial No. 854,063, filed November 19, 1959, now Patent 2,979,680.

In effect, the longitudinal beam is the load cell spring element and the diaphragm is a means for transmitting the loads to be measured to the spring element. Spring element strains, in this case bending deformation of the beam, are most conveniently sensed by bonded resistance strain gauges.

Resistance strain gauges, however, have a concomitant temperature sensitivity and some temperature correction means must be incorporated in the load cell circuit. Since temperature strains are uniform, inherent temperature correction may be provided where equal and opposite load strains are exhibited by the spring element. In such cases a bridge circuit may be formed with four equally active arms, with alternate arms comprised of strain gauges sensing oppositely directed load strains. Provision for this optimum load strain condition would be a significant improvement of the basic beam-diaphragm load cell.

As described above, the diaphragm of the basic cell acts as a load transfer means. Its action would be improved, however, if other interactions such as restraint upon beam deformation could be minimized.

Further, it is especially desirable in the measurement of fluid pressures that gauges sensing the load strains be isolated from the loading fluids and from external ambient effects.

Therefore, it is a general object of this invention to provide an improved beam-diaphragm load cell for the precise measurement of pressure differentials.

A more specific object is to provide an improved beam configuration for beam-diaphragm pressure load cells yielding equal and oppositely directed load strains at surface positions which are substantially isolated from anomalous loading fluid and external effects.

While the novel features are pointed out with particularity in the appended claims, a better understanding of this invention, together with further objects and advantages thereof may be had upon reference to the following description and the accompanying drawings wherein:

FIG. 1 is a plan view, partially broken away, of a beam-diaphragm load cell according to this invention;

FIGS. 2, 3, and 4 are cross-sectional elevations of the load cell of FIG. 1;

FIG. 6 illustrates in plan and FIG. 7 in cross-sectional elevation, a modification of the FIG. 1 load cell particularly for overload protection;

Figure 10:
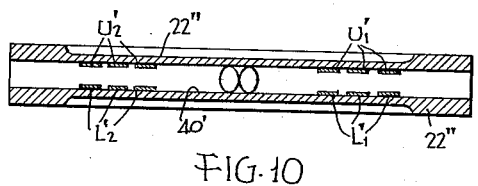

According to the embodiment of this invention shown in FIGS. 1–4, the load cell 10 comprises rigid upper and lower housing plates 12 and 14, and an interposed spring element 16. The spring element comprises, integrally, a rigid circumferential rim 18, a diaphragm 20 and a lateral beam 22. Rim 18 is clamped to and affixed between plates 12 and 14 by a suitable means, bolts 23, for example. Rim 18 cooperates with plates 12 and 14 to provide a rigid fluid-tight load cell housing. In addition, rim 18 acts as a means fixing beam 22 at its ends and diaphragm 20 at its periphery.

Upper and lower fluid chambers 24 and 26 are formed between plate 12 and diaphragm 20 and between plate 14 and diaphragm 20, respectively. Upper and lower chamber fluid inlet ports 28 and 30 may be connected by tubulations 32 and 34 with the systems in which the differential pressures $p_1$ and $p_2$ are generated.

As described in the aforementioned application of William T. Bean, Jr., a differential pressure $(p_1-p_2)$ applied to the area of diaphragm 20 results in an equivalent normal force being transferred to beam 22. Beam 22 deforms in bending as a fixed-end beam exhibiting proportional surface strains which may be gauged and equated to the magnitude and sign of the pressure differential.

Beam 22 is generally rectangular in cross-section and, for normal bending loads, it has a central neutral surface which is equally displaced from its upper and lower lateral surfaces 36 and 38. The central lateral plane of diaphragm 20 meets the beam at its neutral surface so that anomalous distortion of the diaphragm during loading produces least effect upon beam deformation.

External beam-diaphragm surfaces were employed prior to this invention as the gauged-strain producing surfaces. However, bonded resistance strain gauges applied to such surfaces as 36 or 38 were exposed to the working fluids. Gauges at those positions were affected chemically by the working fluids and also physically in that their resistance would vary as a function of normal pressure. The latter effect superimposed a direct strain gauge dependence upon individual magnitudes of fluid pressure which was extremely difficult to resolve from the desired indirect strain gauge dependence upon differential pressure.

Therefore, according to this invention, internal gauge strain producing surfaces are provided for by longitudinal apertures 40 and 42 located symmetrically along the axis of beam 22. It will be appreciated that upper and lower portions of these surfaces at equal distances from the neutral surface of the beam and from the longitudinal center of the beam will be deformed equally and oppositely when beam 22 is deflected in response to differential pressure loadings. Similar resistance strain gauges $U_1$, $U_2$ and $L_1$, $L_2$ are bonded symmetrically to the upper and lower aperture surfaces within beam 22 near its intersection with rim 18 where beam bending stresses are concentrated by the beam end fixing action of the rigid load cell housing.

The strain gauges are completely isolated from both chemical and direct physical affect by the working fluids in chambers 24 and 26. Further, hermetic sealing of apertures 40 and 42 by plugs 44 and 46 isolates the gauges from ambient conditions. Even more significantly, the gauges of the upper and lower pairs are strained equally and the gauges of different pairs are strained equally but oppositely during beam loading. Exact superposition of the strain gauges is illustrated in FIG. 4. The sensitive direction of each gauge is oriented parallel with the longitudinal axis of beam 22 as illustrated by the dashed lines at the gauge positions in FIG. 1.

The gauged strain relationship allows for interconnection of the gauges in the optimum bridge circuit having four equally active arms and providing for inherent temperature compensation.

Figure 5:
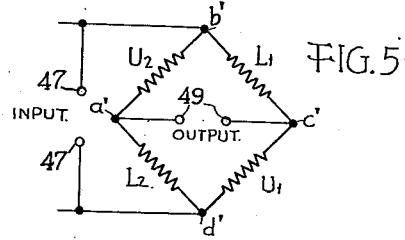
FIG. 5 is a schematic illustration of a bridge circuit comprising strain gauges oriented according to this invention.

The preferred bridge circuit is illustrated schematically in FIG. 5. Alternate arms comprise upper- and lower-surface strain gauges. Bridge excitation is provided across one diagonal by an input to terminals 47 and bridge output is taken across the other diagonal at terminals 49.

Leads to terminals $a'$, $b'$, $c'$ and $d'$, indicated respectively in FIG. 3 as $a$, $b$, $c$, and $d$, may be brought out through plugs 44 and 46 as shown. Alternatively a small diameter aperture 48 may be extended between gauge apertures 40 and 42 so that all strain gauge leads may be brought out at the same side.

With further particular reference to FIGS. 3 and 5, all gauges will exhibit equal and parallel resistance variations due to temperature changes and no bridge unbalance output will result therefrom. Gauges $U_1$ and $U_2$ sense load strains which are equal in magnitude and alike in sign, producing a bridge output proportional to the differential pressure load; the bridge output is augmented, doubled, by gauges $L_1$ and $L_2$ which are also subjected to load strains equal in magnitude and alike in sign (but opposite in sign to strains sensed by $U_1$ and $U_2$). An additional advantage of this arrangement is that if any anomalous horizontal beam loading component arises, gauges $U_1$, $U_2$, $L_1$ and $L_2$ all sense parallel strains which will cancel in their effect upon bridge output.

Overload protection has been a problem with prior pressure load cells. Pressure surges can sometimes create pressure differentials greatly exceeding the design range for a given load cell. Overstressing of beam 22 is substantially eliminated herein by reducing the separation between beam 22 and plates 12 and 14 to equal the maximum safe deflection for beam 22. Upon contact with one of the rigid plates, the beam becomes supported at its center, in which condition it can safely withstand overloads greatly exceeding the design load range.

Where beam and plate contact could interfere with fluid access through ports 28 or 30 of the embodiment illustrated in FIGS. 1–4, the modification of FIGS. 6 and 7 may be preferred. Therein, beam 22 is provided with spaced apart contact buttons 50 of a vertical extent predetermined, with respect to thickness of rim 18, thickness of beam 22, and maximum allowable beam deflection, to transfer excessive beam loads to plates 12 and 14.

Separate overload restricting buttons 50 make beam stiffness adjustments practical. Differential pressure design load ranges may be prescribed for stock spring elements 16 by machining of the beam portion 22; overload range may be separately prescribed by adjusting the vertical dimension of buttons 50. Therefore, one standard ring thickness can serve for several different pressure load ranges.

FIGS. 6 and 7 also illustrate an alternative arrangement for fluid access to chambers 24 and 26. The lateral ports 28' and 30' allow reduction in overall load cell heighth.

Figure 8:
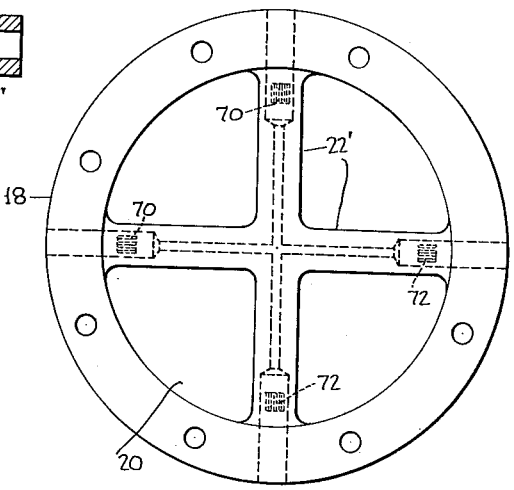
FIG. 8 is a plan view of a multiple-beam modification of the FIG. 1 embodiment.

An alternative method of increasing spring element stiffness is shown by the load cell of FIG. 8 with the upper plate removed. Two similar diametral beams 22' are machined integrally with diaphragm 20 and rim 18. Similarly positioned strain gauges 70 and 72 may then be connected in series into the respective arms of the bridge circuit of FIG. 5.

Figure 9:
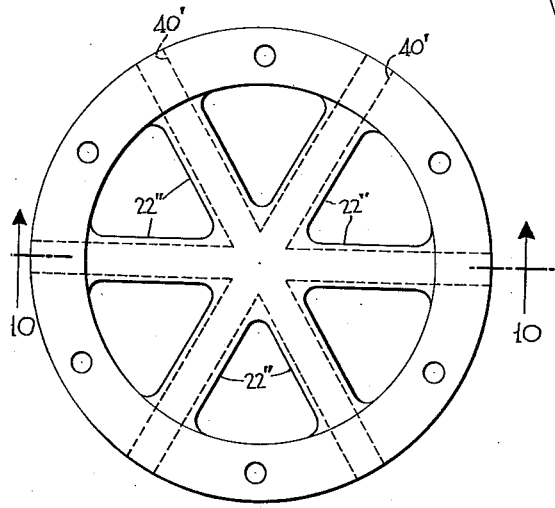
FIG. 9 illustrates in plan and FIG. 10 in cross-section, a further modification of the embodiment of FIG. 8.

The number of diametral beams may be increased to three or more as shown in FIGS. 9 and 10 to achieve greater symmetry about the vertical load cell axis. Independently of the number of beams 22'', apertures 40' may be increased in diameter or in length to alter beam stiffness and bending stress concentrations. Beam strains are greatest at the upper and lower beam surfaces; however, these maxima are approached for the gauged surfaces of apertures 40' when aperture diameter approaches beam thickness. Beam stiffness may be independently controlled by selection of beam width.

As seen in the cross-sectional view of FIG. 10, two or more separate strain gauges $U'_1$, $U'_2$, $L'_1$ and $L'_2$ may be employed at each upper and lower beam end position and connected in various series, parallel, and series-parallel equivalents of gauges $U_1$, $U_2$, $L_1$ and $L_2$ of the FIG. 5 bridge.

Figure 11:
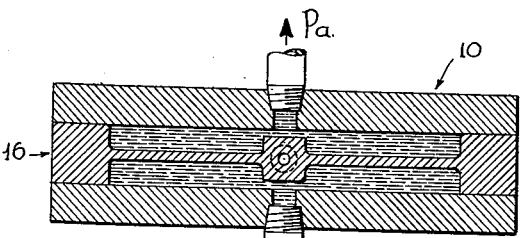
FIG. 11 illustrates the adaption of the load cells of this invention for gauge-pressure measurement.

Hereinabove, description of this invention has assumed two fluids supplied at independently variable pressures $p_1$ and $p_2$. FIG. 11 illustrates the application of the load cell of FIG. 1 for gauge-pressure measurements. Here, chamber 24 is opened to air at atmospheric pressure as one working fluid. The unknown fluid pressure $p_f$ is then compared with atmospheric pressure $p_a$. Alternatively $p_a$ may be some constant or reference pressure relative to which measurements of unknown pressure $p_f$ are readily accomplished.

Figure 12:
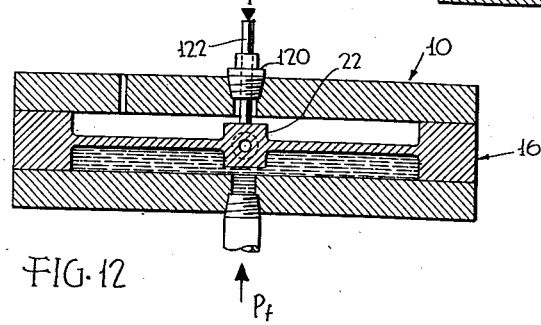
FIG. 12 illustrates adaption for measurements of absolute pressures.

Further, as represented in FIG. 12, differential measurements may be made by the load cells of this invention as a loading force F and a fluid pressure $p_f$. The load cell of FIG. 1 is here provided with a fitting 120 through which a translatable pusher rod 122 is admitted into direct contact with beam 22. Force F may be generated by some variable phenomena or may be a reference force against which comparison of pressure $p_f$ is required.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pressure load cell comprising a pressure chamber defining housing and, included within said housing, a spring element shaped to define integrally a rigid rim, a diaphragm, and a diametral beam, said spring element being diametrically apertured along the longitudinal axis of said beam to define gauging surface bores extending from said rim into the ends of said beam, and strain gauging means cooperatively coupled with surfaces of said bores within the ends of said beam and responsive to strains due to normal bending of said beam.

2. The pressure load cell of claim 1 wherein the neutral plane of said beam and the central plane of said diaphragm coincide.

3. A pressure load cell comprising upper and lower rigid plates and an interposed spring element, said spring element being shaped to define integrally a rigid rim, a diaphragm, and a diametral beam having its neutral plane coinciding with the central plane of said diaphragm, said plates, rim, and diaphragm being rigidly assembled together and defining therebetween an upper fluid chamber and a lower fluid chamber, said plates being apertured to define inlet ports to said chambers, said spring element being diametrally apertured along the longitudinal axis of said beam and defining gauging surface bores extending from said rim into the ends of said beam, and resistance strain gauges bonded to surfaces of said bores within the ends of said beam and responsive to normal bending strains of said beam.

4. A pressure load cell comprising similar upper and lower circular rigid plates and a coaxially interposed spring element means, said spring element means including integrally a rigid cylindrical rim with its outer diameter substantially equal to the diameter of said plates, a lateral diaphragm, and a diametral beam, the neutral plane of said beam coinciding with the central diametral planes of said diaphragm and of said rim, said plates, rim and diaphragm being rigidly assembled together and defining therebetween an upper fluid chamber and a lower fluid chamber, said plates being apertured to define inlet ports to said chambers, said spring element means being diametrally apertured to define gauging surface bores extending coaxially with the longitudinal axis of said beam from the periphery of said rim into the ends of said beam, and resistance strain gauges bonded to surfaces of said bores within the ends of said beam and responsive to strains at said surfaces generated proportional to bending of said beam.

5. The pressure load cell of claim 4 wherein said spring element means includes a plurality of similar equiangularly intersecting beams.

6. The pressure load cell of claim 4 wherein four resistance strain gauges are bonded respectively to upper and lower longitudinally opposed portions of said surfaces within opposite ends of said beam and interconnected in a four-arm bridge network having adjacent arms composed of a strain gauge bonded to an upper one of said surfaces and a strain gauge bonded to a lower one of said surfaces.

References Cited in the file of this patent

UNITED STATES PATENTS

| | | |
|---|---|---|
| 2,507,501 | Clark | May 16, 1950 |
| 2,680,376 | Shaw et al. | June 8, 1954 |